United States Patent
Divekar

(10) Patent No.: US 11,163,915 B2
(45) Date of Patent: Nov. 2, 2021

(54) THREE-DIMENSIONAL MODELED OBJECT

(71) Applicant: Dassault Systemes, Velizy Villacoublay (FR)

(72) Inventor: Ameya Divekar, Maharashtra (IN)

(73) Assignee: DASSAULT SYSTEMES, Velizy Villacoublay (FR)

( * ) Notice: Subject to any disclaimer, the term of this patent is extended or adjusted under 35 U.S.C. 154(b) by 845 days.

(21) Appl. No.: 14/577,056

(22) Filed: Dec. 19, 2014

(65) Prior Publication Data
US 2015/0186555 A1 Jul. 2, 2015

(30) Foreign Application Priority Data

Dec. 31, 2013 (IN) .......................... 4141/MUM/2013

(51) Int. Cl.
G06F 30/00 (2020.01)
G06T 17/10 (2006.01)
G06F 30/17 (2020.01)
G06F 111/02 (2020.01)
G06F 111/20 (2020.01)

(52) U.S. Cl.
CPC .............. *G06F 30/00* (2020.01); *G06F 30/17* (2020.01); *G06T 17/10* (2013.01); *G06F 2111/02* (2020.01); *G06F 2111/20* (2020.01)

(58) Field of Classification Search
None
See application file for complete search history.

(56) References Cited

U.S. PATENT DOCUMENTS

| | | | |
|---|---|---|---|
| 5,265,197 A * | 11/1993 | Kondo | G06T 17/00 345/420 |
| 5,838,328 A * | 11/1998 | Roller | G06T 19/20 345/420 |
| 8,429,174 B2 * | 4/2013 | Ramani | G06F 17/30259 345/419 |
| 8,812,272 B2 | 4/2014 | Martin | |
| 9,798,835 B2 * | 10/2017 | Rorato | G06F 17/50 |
| 10,037,404 B2 * | 7/2018 | Wiening | G06F 17/5086 |

(Continued)

FOREIGN PATENT DOCUMENTS

CN 102542093 A 7/2012

OTHER PUBLICATIONS

Bai, Jing, Shuming Gao, Weihua Tang, Yusheng Liu, and Song Guo. "Semantic-based partial retrieval of CAD models for design reuse." In 2009 SIAM/ACM Joint Conference on Geometric and Physical Modeling, pp. 271-276. ACM, 2009.*

Cheng, Fengbei, Zhenyu Liu, Guifang Duan, Chan Qiu, Bing Yi, and Jianrong Tan. "Complex CAD surface shape design using semantic features." Journal of Mechanical Science and Technology 28, No. 7 (2014): 2715-2722.*

(Continued)

*Primary Examiner* — Omar F Fernandez Rivas
*Assistant Examiner* — Robert S Brock
(74) *Attorney, Agent, or Firm* — Hamilton, Brook, Smith & Reynolds, P.C.

(57) ABSTRACT

The invention notably relates to a computer-implemented method for designing a 3D modeled object. The 3D modeled object is stored in a database. The method provides the 3D modeled object having a plurality of features; selects, upon user action, a first geometry of a first feature; queries and retrieves from the database at least one specification according to the selected first geometry. The method selects at least one second feature; and applies, on the selected at least one second feature, the specification retrieved from the database.

11 Claims, 6 Drawing Sheets

(56) References Cited

U.S. PATENT DOCUMENTS

| | | | | |
|---|---|---|---|---|
| 10,152,198 | B2* | 12/2018 | Radet | G06F 3/0482 |
| 2003/0060913 | A1* | 3/2003 | Turner | G06F 17/5095 |
| | | | | 700/103 |
| 2006/0007229 | A1* | 1/2006 | Nonclercq | G06F 17/30554 |
| | | | | 345/419 |
| 2008/0215510 | A1* | 9/2008 | Regli | G06T 19/00 |
| | | | | 706/12 |
| 2009/0256843 | A1* | 10/2009 | Dedhia | G06F 17/50 |
| | | | | 345/420 |
| 2009/0259442 | A1* | 10/2009 | Gandikota | G06F 17/50 |
| | | | | 703/1 |
| 2010/0013833 | A1* | 1/2010 | Gandikota | G06F 17/50 |
| | | | | 345/420 |
| 2012/0078587 | A1* | 3/2012 | Martin | G06F 17/50 |
| | | | | 703/1 |
| 2012/0109350 | A1* | 5/2012 | Buchowski | G06F 17/50 |
| | | | | 700/98 |
| 2012/0120052 | A1* | 5/2012 | Gong | G06T 19/00 |
| | | | | 345/419 |
| 2013/0080121 | A1* | 3/2013 | Gibson | G06F 17/50 |
| | | | | 703/1 |
| 2013/0346029 | A1* | 12/2013 | Mattson | G06F 17/50 |
| | | | | 703/1 |
| 2014/0358491 | A1* | 12/2014 | Baardse | G06F 17/50 |
| | | | | 703/1 |
| 2015/0278400 | A1* | 10/2015 | Mattson | G06F 17/50 |
| | | | | 703/1 |
| 2015/0302114 | A1* | 10/2015 | Patrick | G06F 17/50 |
| | | | | 703/1 |
| 2015/0356209 | A1* | 12/2015 | Han | G06T 19/20 |
| | | | | 703/1 |
| 2018/0181682 | A1* | 6/2018 | Rorato | G06F 30/00 |
| 2018/0365344 | A1* | 12/2018 | Jarvinen | G06F 30/00 |
| 2019/0042667 | A1* | 2/2019 | Amadon | G06N 20/00 |
| 2019/0318045 | A1* | 10/2019 | Cruz Huertas | G06F 30/00 |
| 2020/0019649 | A1* | 1/2020 | Kumar | G06F 30/12 |

OTHER PUBLICATIONS

Di Stefano, Paolo, Francesco Bianconi, and Luca Di Angelo. "An approach for feature semantics recognition in geometric models." Computer-Aided Design 36, No. 10 (2004): 993-1009.*

Divekar, Ameya P., and Joshua D. Summers. "Investigation of the design exemplar as a CAD query language." In DS 31: Proceedings of ICED 03, the 14th International Conference on Engineering Design, Stockholm. 2003. 10 pages.*

Divekar, Ameya, and Joshua D. Summers. "The Design Exemplar: The Foundation for a CAD Query Language." In ASME 2003 International Design Engineering Technical Conferences and Computers and Information in Engineering Conference, pp. 535-546. American Society of Mechanical Engineers, 2003.*

M. J. Egenhofer, "Spatial SQL: a query and presentation language," in IEEE Transactions on Knowledge and Data Engineering, vol. 6, No. 1, pp. 86-95, Feb. 1994. doi: 10.1109/69.273029.*

Maier Jonathan, R. A., Anandan Srinivasan, Bapat Vikram, D. Summers Joshua, and Bettig Bernhard. "A Computational Framework for Semantically Rich Design Problems Based on the Theory of Affordances and Examplar Technology." Guidelines for a Decision Support Method Adapted to NPD Processes (2007). 12 pages.*

Joshua D. Summers, Expressiveness of the Design Exemplar, 2005, 12 pages obtained from https://www.researchgate.net/profile/Joshua_Summers/publication/238620994_Expressiveness_of_the_Design_Exemplar/links/572b69e108ae057b0a09516b.pdf on May 5, 2017.*

Summers, Joshua D., Ameya Divekar, and Srinivasan Anandan. "Towards establishing the design exemplar as a CAD query language." Computer-Aided Design and Applications 3, No. 1-4 (2006): 523-534.*

Y. Zhang and X. Luo, "Design Intent Information Exchange of Feature-Based CAD Models," 2009 WRI World Congress on Computer Science and Information Engineering, Los Angeles, CA, 2009, pp. 11-15. doi: 10.1109/CSIE.2009.536.*

Joe Medeiros, Use SolidWorks Utilities to improve the way you work, Javelin-Tech Journal, May 2007, 7 pages, obtained from http://www.javelin-tech.com/newsletter/tech_old/2007/may/solidworks_utilities.htm on Jan. 5, 2020 (Year: 2007).*

Wang, Chensheng, Imre Horváth, and Joris SM Vergeest. "Towards the reuse of shape information in CAD." In Proceedings of TMCE'00, Wuhan, PR China, pp. 103-116. 2002 (Year: 2002).*

* cited by examiner

THREE-DIMENSIONAL MODELED OBJECT

RELATED APPLICATION(S)

This application claims priority under 35 U.S.C. § 119 or 365 to Indian, Application No. 4141/MUM/2013, filed Dec. 31, 2013. The entire teachings of the above application(s) are incorporated herein by reference.

FIELD OF THE INVENTION

The invention relates to the field of computer programs and systems, and more specifically to a method, system and program for designing a three-dimensional modeled object.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

A designers using CAD modeling software captures his design intent either implicitly or explicitly. The term design intent means the designer's project objectives or requirements. The designer provides feature specifications and constraints as mechanisms to capture the design intent explicitly. The specification of a feature is a written description of the feature.

In practice, a designer wants to use similar design intents on several features in order to save up time when designing a modeled object. Moreover, he may want to reuse design intents from one feature and have similar design intent on other features. Reusing design intent is particularly of more importance when designers want to make changes to original design intents and propagate these to other features.

Some known CAD software solutions allow for reuse of created geometry by allowing a copy and paste of features or replacing a specification of features. However, they fall short of understanding the design intent based on a sub-element of the feature or the user selection. In other words, designers may appreciate that the CAD softwares understand the design intent they want to reuse, from their selection of a representation that captures that design intent.

When effecting a similar design change across several features, currently the designer needs to effect the change individually in every feature. To explain in mathematical terms, if a user needs n steps to effect a design change on one feature and he desires to effect such design changes in k other features, then essentially the user needs n×k steps to effect all the design changes.

Furthermore, management of changes requests requires the edition of geometry with respect to some reference geometry. This reference geometry is not necessarily independent reference geometry, such a Surface, Plane, Axis in a Geometrical Set but more implicit geometry such as the top limit of a Pad, Bottom of the Hole, type of a hole etc.

Currently, none of the known CAD software solutions allows for inferring the design intent based on the geometry selection of the user. In other words there is currently no mechanism to allow designers to reuse design intent at the granularity level of a feature specification, based on the selection of the user.

Hence, designers are not able to reuse the semantics of their features across other features.

Within this context, there is still a need for an improved method for designing a feature-based three-dimensional modeled object.

SUMMARY OF THE INVENTION

It is therefore provided a computer-implemented method for designing a three-dimensional modeled object, the three-dimensional (3D) modeled object being stored in a database. The method comprises:
  providing the 3D modeled object having a plurality of features;
  selecting, upon user action, a first geometry of a first feature;
  querying and retrieving in the database at least one specification according to the selected first geometry;
  selecting at least one second feature;
  applying, on the selected at least one second feature, the said at least one specification retrieved from the database.

The method may comprise one or more of the following:
  the step of querying and retrieving in the database comprises:
  identifying the first feature to which the selected first geometry belongs;
  identifying a profile from which the first feature has been built;
  finding at least one part of the identified profile, from which the selected geometry results; and
  finding at least one specification associated with the at least one part found in the database;
  after identifying a profile:
  identifying the parts forming the profile;
  indexing each part of the profile;
  and wherein finding the at least one specification is carried out according to the index associated with the part of the profile from which the selected geometry results;
  the step of selecting at least one second feature comprises selecting at least one second feature that is similar to the first feature;
  the first and second feature are detected as being similar when both are of the same type;
  selecting, upon user action, an additional specification to be applied on the selected at least one second feature, and wherein the step of applying comprises applying, on the selected at least one second feature, the said at least one specification retrieved from the database and the additional specification;

the additional specification is selected among a set of specifications identified in the first feature.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

The teachings of all patents, published applications and references cited herein are incorporated by reference in their entirety.

Figure 1:
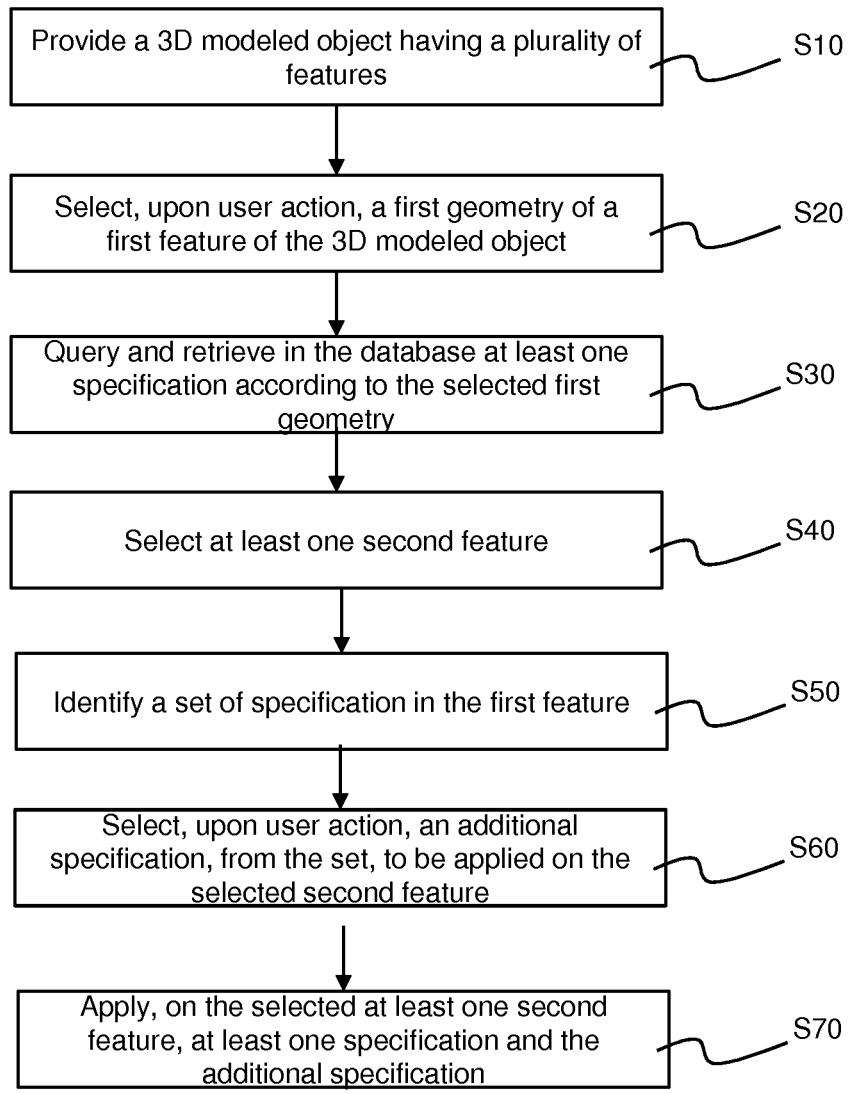
FIG. 1 shows a flowchart of an example of the method.

With reference to the flowchart of FIG. 1, it is proposed a computer-implemented method for designing a three-dimensional (3D) modeled object. The 3D modeled object is stored in a database. The method comprises providing the 3D modeled object having a plurality of features. The 3D modeled object is thus a feature-based 3D modeled object. The method further comprises selecting, upon user action, a first geometry of a first feature. The method also comprises querying in the database and retrieving in the database at least one specification according to the selected first geometry. The method further comprises selecting at least one second feature. The selected second feature may be similar to the first feature. Then, the method comprises applying, on the selected at least one second feature, the said at least one specification retrieved from the database.

Such a method improves the designing of a 3D modeled object as a new way to reuse design intent by inferring it from a user selection. The user selection of a geometry of a feature (e.g. a visual representation of the geometry) captures some design intent, associated with the feature. Said in other words, the identification of specification(s) is performed according to the user selection of a geometry of a feature of the 3D modeled object. Hence, semantics (or specification(s)) are captured and reused on other features of the 3D modeled object. This allows users to quickly propagate their design intents to several features in lesser steps.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the selection a first geometry is performed upon user action. Similarly, the step of selecting at least one second feature may be performed upon user action.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, a database may comprise a three-dimensional modeled object, the 3D modeled object having a plurality of features. The database may also store one or more specifications of each feature of the feature-based 3D modeled object.

The method generally manipulates modeled objects. A modeled object is any object defined by data stored in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). The modeled object is here a feature-based modeled object. Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software of hardware, adapted for the analysis of the physical behavior of modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality of components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of $d^2$at a related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 11:
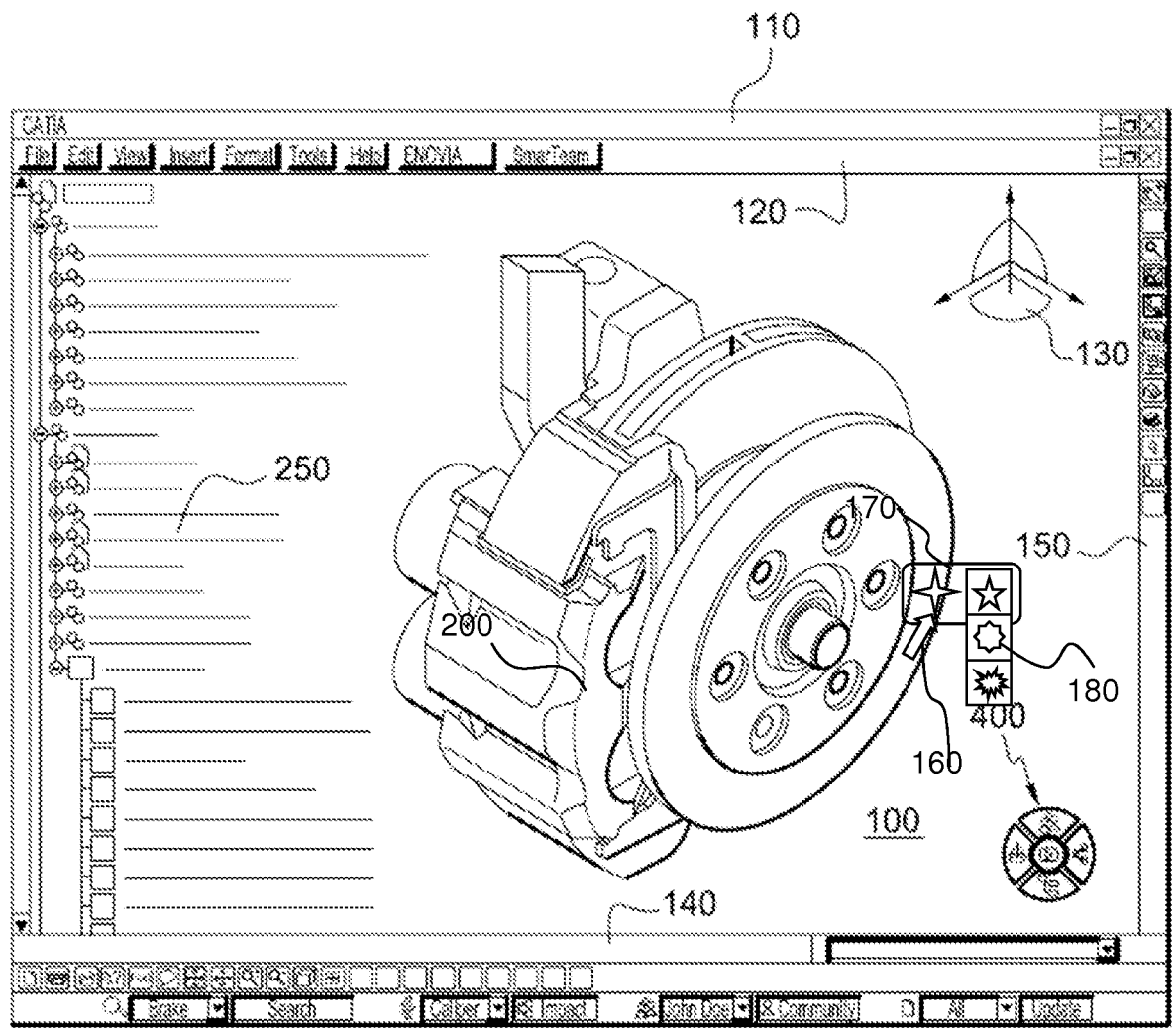
FIG. 11 shows an example of GUI wherein the method according to the invention can be performed.

FIG. 11 shows an example of the GUI of the system, wherein the system is a CAD system.

The GUI 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art. Some of these icons are associated with software tools, adapted for editing and/or working on the 3D modeled object 200 displayed in the GUI 100. The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of the 3D modeled object displayed on the screen.

Figure 2:
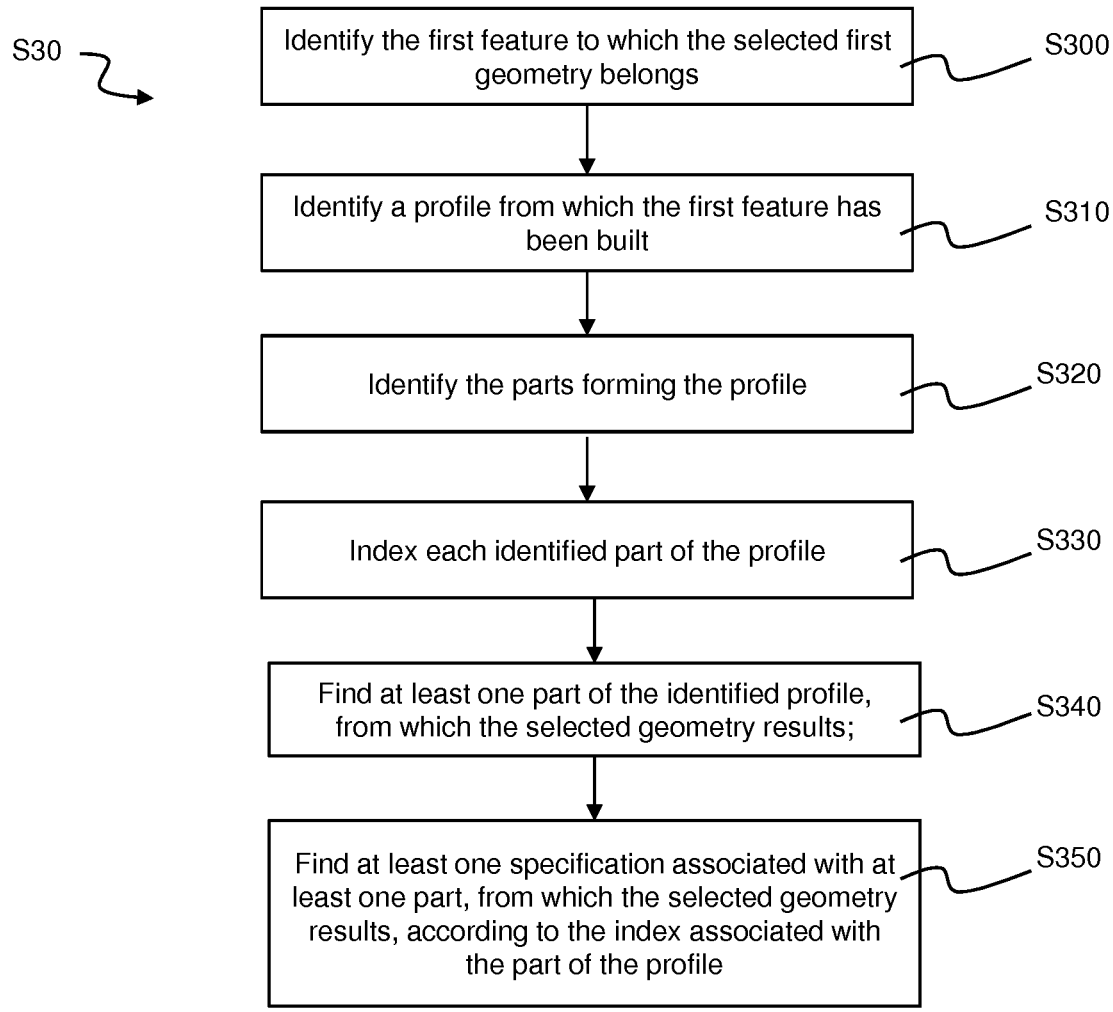
FIG. 2 shows a flowchart depicting an example of the step S30 of the method of FIG. 1.

The GUI may for example display data 250 related to the displayed product 200. In the example of FIG. 2, the data 250, displayed as a "feature tree", and their 3D representation 2000 pertain to a brake assembly including brake caliper and disc. The GUI may further show various types of graphic tools 130, 170, 180, 400 for example for facilitating 3D orientation of the object, for triggering a simulation of an operation of an edited product or render various attributes of the displayed product 200. A cursor 160 may be controlled by a haptic device to allow the user to interact with the graphic tools.

Figure 12:
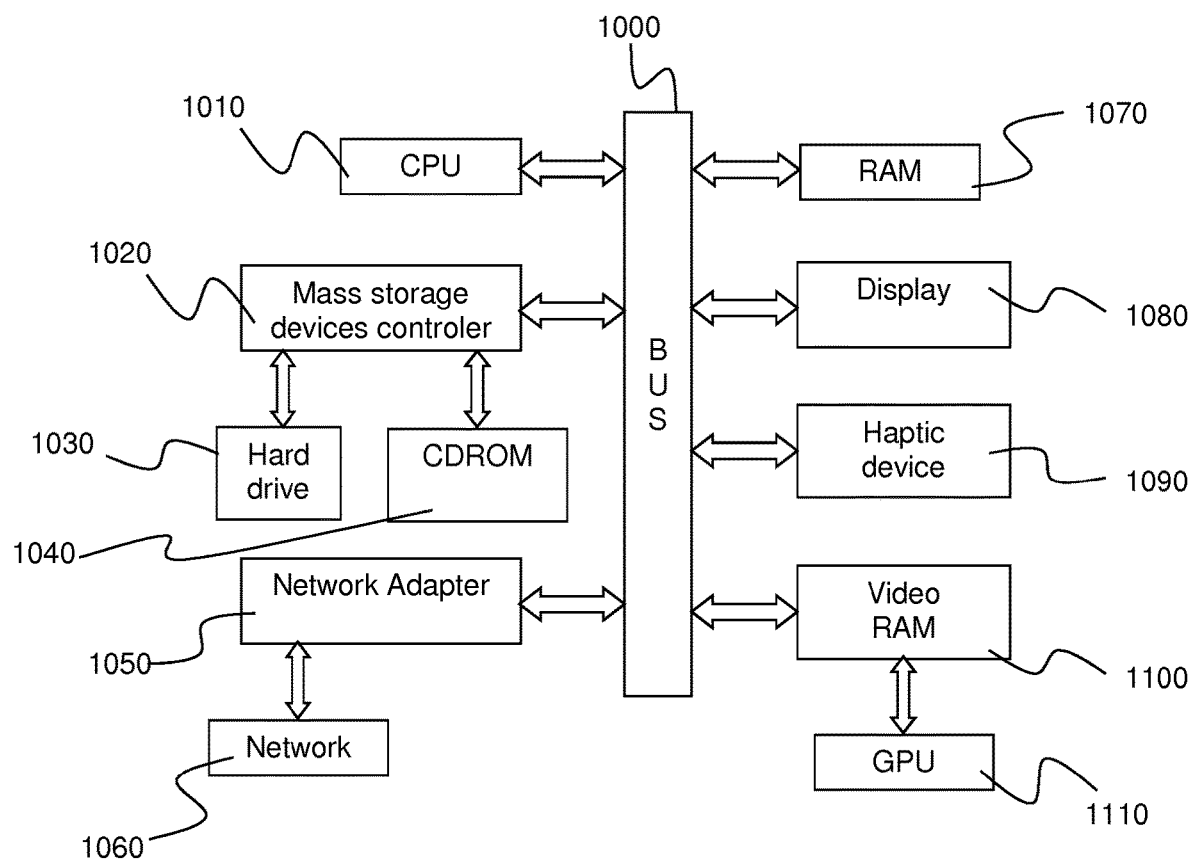
FIG. 12 shows an example of a computer system for performing the method according to the invention.

FIG. 12 shows an example of a system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

Referring now to FIG. 1, it is discussed an example of the method according to the invention.

At step S10, it is provided a three-dimensional (3D) modeled object having a plurality of features. The 3D modeled object is stored in a database. Providing a 3D modeled object means that data of 3D modeled object are available to the CAD system carrying out the method of the invention. For instance, data of the 3D modeled object are provided to a scene run by the CAD system. Hence, the 3D modeled object is loaded in the 3D scene, but not necessarily represented to the user. Providing the 3D modeled object may be the result of a two consecutive steps of searching in the database and retrieving from the database data of the 3D modeled object.

The 3D modeled object may be automatically provided by the system, e.g. a 3D modeled object that was designed in a former design session. A session is a time period during which the user interacts at least one time with the CAD system. In practice, the user logs on to the system each time he/she wants to perform a design, and the former design session may loaded when the user logs in.

Alternatively, the 3D modeled object may be provided as the result of a selection performed upon user action. The user may carry out the selection via a haptic device such as a keyboard, a mouse, a stylus, a touch sensitive display, or the like. For instance, in a two-button mouse, the left button could be used for selecting the first and/or the second part. The selection may be performed, but not limited to, into a list of parts, wherein the list may be a textual list or a list of 2D or 3D representations of the parts.

The term feature means a geometric object that forms a part of the 3D modeled object. The 3D modeled object is thus a feature-based modeled object, as known in the art. The feature has thus geometric properties. It may further comprise topological properties. The geometric properties and the topological properties (if any) form the specifications of the feature: a specification of a feature is thus a written description of the geometry of the feature and the rules applies to said geometries of the features. Hence, a feature is a generic shape that belongs to a product and that is associated with specification(s) useful for reasoning about the product that is designed.

In practice, a feature of the 3D modeled object may be obtained from a profile; the feature is called a profile-based feature. The geometrical shape of a profile-based feature is typically obtained from a two-dimensional shape (the profile) from which a swept volume is obtained, as known in the art.

Figure 3:
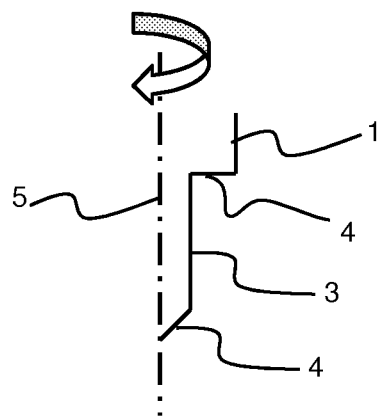
FIG. 3 shows an example of a profile-based hole feature.

FIG. 3 illustrates a profile of a hole feature of the type counter-bored: the profile comprises four parts 1, 2, 3, 4 that are connected, thus forming a set of connected edges. Each part may be also referred to as wire connecting two vertices. It is to be understood that the wire connecting two vertices may be of any type: straight line, curved line, etc. The counter-bored hole feature is formed by revolving the profile about an axis 5. Here, the profile has performed a rotation of 360° about the axis 5. FIGS. 4 to 7 show different views of the counter-bored feature obtained from the profile illustrated on FIG. 3. It is to be understood that the volume contained is the volume defined by the rotation of the profile is empty. A geometry results from each part of the profile. This means that at least one geometry is created from the surface swept by the part.

Figures 6, 7:
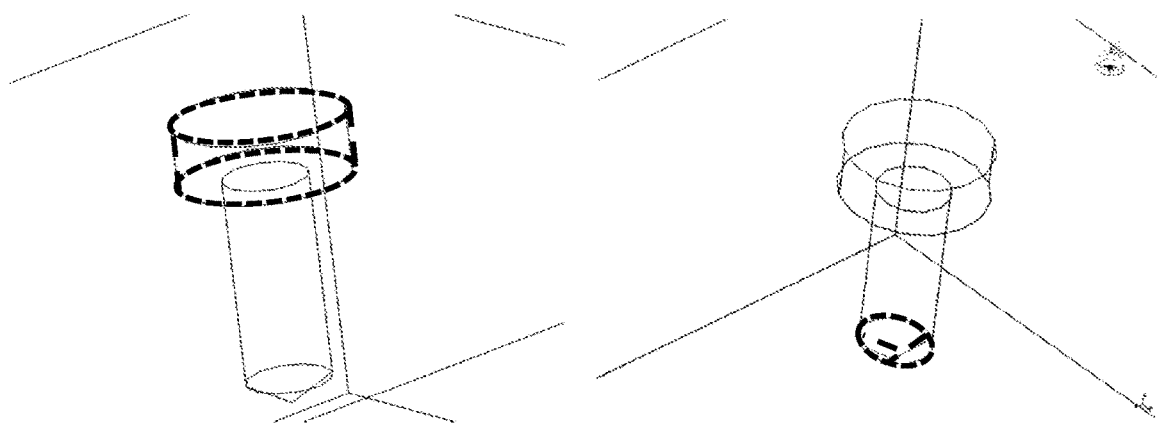

Referring now to FIG. 6, the hatched lines show the geometry obtained from the part 1 of the profile represented on FIG. 3. The resulting geometry is a surface having the general form of a cylinder.

Figures 4, 5:
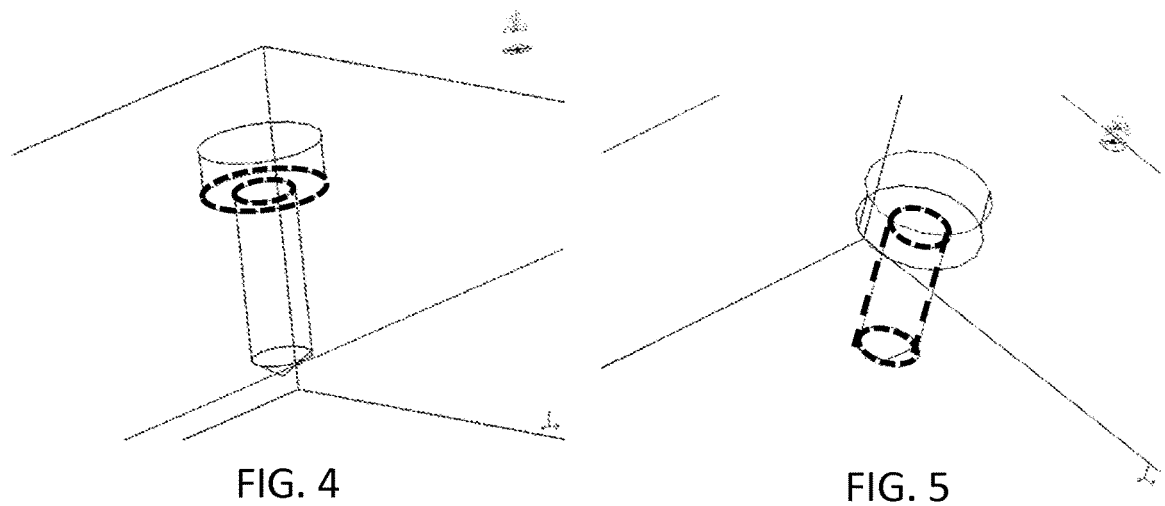
FIGS. 4 to 7 show examples of parts and geometries of the profile-based hole feature of FIG. 3.

Referring now to FIG. 4, the hatched lines show the geometry obtained from the part 2 of the profile represented on FIG. 3. A disk is obtained from the surface swept by the edge 2.

Referring now to FIG. 5, the hatched lines show the geometry obtained from the part 3 of the profile represented on FIG. 3; here a cylinder is obtained.

Referring now to FIG. 7, the hatched lines show a circular conical surface obtained from the part 4 of the profile represented on FIG. 3.

Hence, the counter-bored hole feature represented on FIGS. 4 to 7 comprises four geometries, each one being generated from a part of the profile. For each geometry of the feature, a generator may be associated: the term generator means the part of the profile from which the geometry is generated.

Back to FIG. 1, at step S20, the user selects a first geometry of a first feature. The selection may be carried out via a haptic device such as a keyboard, a mouse, a stylus, a touch sensitive display, or the like. The selection may be performed, e.g. into a list of geometries, wherein the list may be a textual list or a list of 2D or 3D representations of the parts. For instance, the left button of a two-button mouse can be used for selecting the first geometry when the cursor of the mouse is over the representation of the geometry. On FIG. 6, the user has selected the cylinder of the counter-bored hole feature represented on a display, and the representation of the selected feature is altered—the outlines of the cylinder are represented with hatched lines—in order to show to the user what geometry has been selected.

Then, at step S30, the database on which the 3D modeled object is stored is queried for retrieving, from the database, at least one specification according to the selected first geometry. Hence, the selection of the geometry at step S20 triggers the identification of one (or more) specification that is associated to said selected geometry.

For the sake of explanation, an example of the step S30 is now described in reference to FIG. 2. In this example, the features of the 3D modeled object are profile-based features stored in the database. For each profile-based feature, at least the profile and the specifications of the feature are stored in the database. Values that may be associated with each specification of the feature can be stored together with the specifications. The database may further store the geometries resulting from the part of the profile. In practice, the geometries are created when the feature is instantiated and are stored on the database. They created geometries may be temporarily stored on the database.

At step S300, after the selection by the user of the first geometry, the feature to which the selected geometry belongs is identified. The identification is performed as known in the art. In practice, the system that performs the method stores the geometries of each instantiated feature so that the identification of a feature allows a direct identification of the geometries, and inversely, the identification of a geometry allows to infer the feature to which it belongs. Thus, there is a mapping between the geometries and the belonging features.

Then, at step S310, the profile from which the feature identified at step S300 has been built is identified. This identification may be directly performed in the database as the profile of each profile-based feature is stored together with the feature, as discussed above. Identifying in the database is synonymous of querying in the database.

Next, at step S320, parts forming the profile are identified. These information may be stored with the profile of the feature, that is, the set of parts forming the profile are stored on the database.

Alternatively, the set of parts of the profile may be deduced from the profile stored in the database, e.g. by searching the set of connected edges forming the profile. For instance, the parts may be stored in pre-determined manner, for example, a counter bored hole will always have the parts stored from top of the hole to the bottom.

Then, at step S330, each part of the profile is indexed. This involves that each part of the profile is associated with a unique identifier. For instance, the parts of the profile shown on FIG. 3 have been indexed as each part is associated with a numerical value 1, 2, 3, 4 that allows identifying each part. Hence, it is possible to order the parts from the indexing.

It is to be understood that the indexing of the one or more parts of a profile may be stored on the database together with information relative to the profile of the feature. In this case, indexing each part of the profile means that index value associated with each part is identified in the database. Alternatively, the index is not stored in the database, but the order of the parts is known for each hole type, so the index may be easily identified.

Once each part of the profile is indexed, it is possible to individually select the part and information of the part of the profile.

Next, at step S340, at least one part, from which the selected geometry results, is found in the database. In practice, one single part is found for one selected geometry, being understood that more than one geometry may result from a part. As discussed above, the database may store or temporarily store the geometries resulting from the part of the profile. The identification of one part may thus be performed using the database, e.g. by using relations between geometries and parts stored in a relational database.

Then, at step S350, at least one specification associated with the at least one part found at step S340 is found in the database. In practice, the indexing of the part performed at step S330 is exploited in order to identify the specification. Indeed, the database may store a mapping between specification and parts of the profile, the mapping using the indexing of the parts in order to identify the associated specification. As discussed above, the specifications of a feature are separately stored from the profile of the feature and the geometries resulting from the part(s) of the profile.

The algorithm of steps S300 to S350 for finding in a database a specification based on the selection of a geometry, is now depicted in reference to FIGS. 4 to 7 and FIGS. 9 to 10. In this example, one considers a 3D modeled object displayed in a graphical user interface (for instance the GUI 100 of FIG. 11) on which four holes features are present in a pad 98, as illustrated on FIG. 9. The hole feature 90 is of the type counter-bored hole, while the hole features 92, 94, 96 are of the type of through holes. The term type means a category of hole to which the feature belongs. As an example, a hole may be, but is not limited to, of the type though hole, countersink hole, blind hole, . . . . The pad 98 is also a feature in this example.

Figure 9:
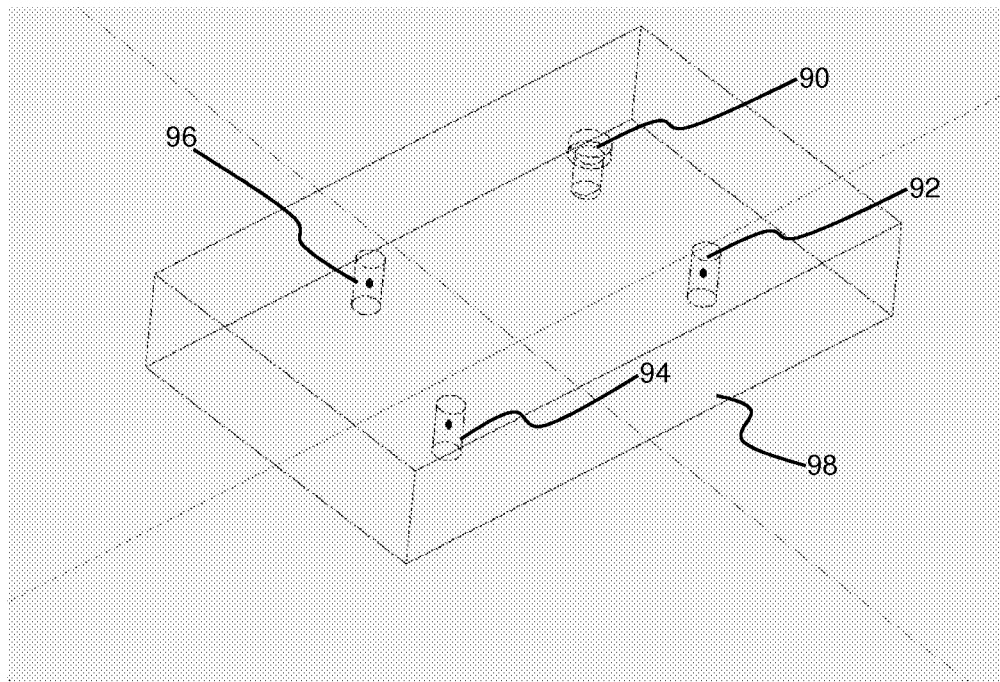
FIGS. 9 and 10 show screenshot of GUI wherein a 3D modeled object is designed in accordance with the present invention.

The database stores the 3D modeled object represented on FIG. 9; namely, the data of the features 90, 92, 94, 96, and 98. The database may be a relational database. The data related to the feature comprise:

(i) the profile of the hole features of the type through hole;

(ii) the profile of the hole features of the type counter-bored hole the four parts of the profile respectively associated with indexing values 1, 2, 3, 4, as shown on FIG. 3;

(iii) the profile of the pad features;

(iv) the geometry resulting from each part of a profile;

(v) the type of each feature;

(vi) specification (if any) associated with each part of the profile.

Figure 8:
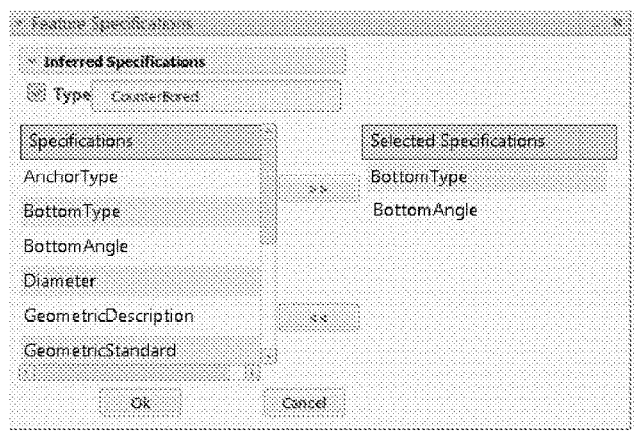
FIG. 8 shows an example of feature specifications panel with the type of hole as inferred specification.

It is to be understood that a part may not be associated with a specification. The mapping (one could also say the relation) between parts and specifications is maintained via the indexation of the parts. Examples of specifications are given on FIG. 8 for a hole feature of the type counter-bored. In this example, the counter bore has a diameter 15 mm and the hole diameter equals to 10 mm.

The user selects the counter-bored face of the hole 90. After the selection of the face geometry, the hole feature is identified in the database. Incidentally, the feature type is also inferred while identifying the feature, here the feature is of type counter-bored hole.

Then, the profile and the parts of the feature are identified in the database. Subsequently, the part that have been indexed 1 and that is associated with the selected face geometry is found in the database.

From now, as the index of the part from which the selected geometry result is 1, the specification inferred in the database is that the selected face of the hole feature uniquely represents the counter-bore of the hole. Furthermore, the selected geometry also represents the counter-bored diameter specification. Hence, in this example, two specifications are associated with the identified part: the type of hole (counter-bored) and the diameter of the hole (15 mm).

In the event the user would have selected the disk resulting from the part indexed 2, the specification inferred in the database is the depth of counter-bored hole.

In the event the user would have selected the geometry (a cylinder) obtained from the part 3 of the profile represented on FIG. 3, the retrieved specification is the diameter of the hole.

As another example, if the user would have selected the circular conical surface resulting from the part 4 of the profile represented on FIG. 3, then the specification retrieved is the bottom-type of the hole.

Referring back to FIG. 1, at step S40, at least one second feature is selected. The selection may be performed upon user action, or it may be automatically selected by the system performing the method according to the invention.

In practice, the selected second feature is similar the selected first feature, that is, the second feature is almost the same as the first one. When automatically selected, the system searches features having the most important number of common characteristics with the first feature. By characteristics is meant the geometry, specifications associated with the geometry. In general, the second feature is of the same type as for the first feature. For instance, and in referring to FIG. 9, both the first feature 90 and the second feature 92 are of type hole, which involve that these two feature have similar geometries and specifications, e.g. the diameter of the hole. In FIG. 9, several hole features 92, 94, 96 are automatically selected.

Then, at step S50, a set of specification of the first feature is identified in the database. This is typically performed by searching all the specifications mapped to the parts of the profile of the first feature.

Next, at step S60, the user may select an additional specification to be applied on the selected second feature(s). The additional specification is selected in the set identified at step S50. The selection may be performed through a feature specifications panel as depicted on FIG. 8: the left part of the panel provides to the user a list of specification inferred for the counter-bored hole feature, and the right part of the panel shows the specifications selected by the user, here the Bottom Type and the Bottom Angle.

Then, at step S70, the specification retrieved from the database at step S30 is applied on the selected second feature(s); for instance, the value of the specification is applied on the selected second feature. In the event the user has selected one or more additional specifications at step S60, these specifications are also applied on the selected second feature(s). Applying a specification on a feature means that the feature is modified so that the specification and the value associated with the specification have effect on the feature. Said otherwise, a propagation of the specification(s) is carried out.

Figure 10:
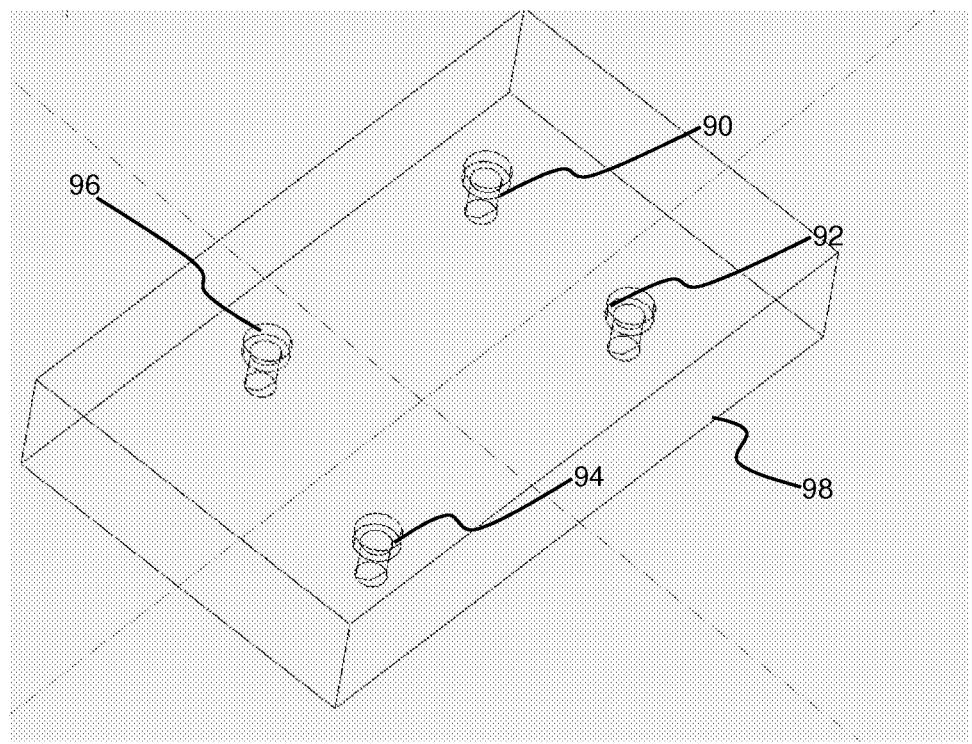

Referring now to FIG. 10, it is shown the 3D modeled object of FIG. 9 on which the specification associated with the counter-bored face of the hole 90 selected by the user and the specifications selected by the user at step S60 are applied on each feature 92, 94, 98. Here, three specifications are applied on each feature 92, 94, 98: Counter-Bored hole, Bottom Type and the Bottom Angle. By applying these three specifications, the features 92, 94, 98 are modified so that they are of the type counter-bored hole instead of through hole, and their bottoms are modified for forming circular conical Bottom with a given angle value. For instance, the value of the specification describing the type of the hole is changed from "Simple" to "Counterbored". This is followed by a build of the feature. Building the feature has the effect of the new value (counter-bored type of hole) and is manifested in the geometry and topology of the hole.

The propagation of the specification(s) retrieved in the database and/or selected by the user may be carried out by performing the following steps:

1) Iterate the list of selected features by the user;
2) For each feature selected by the user:
   a. Retrieve the list of specifications to propagate;
   b. For each specification of the list:
      i) Retrieve the value of the specification to be propagated from the first feature to the second one(s);
      ii) Propagate the value of the specification to the second one(s).

The preferred embodiment of the present invention has been described. It will be understood that various modifications may be made without departing from the spirit and scope of the invention. Therefore, other implementations are within the scope of the following claims. For instance, the features can be non-profile based features. In this case, the selected geometry that represents the non-profile based feature may be retrieved. The specifications related to the selected geometry represent the semantics of the selection. Hence, for a non-profile based feature, it is not necessary to deduce the profile of the feature. The specification(s) related to the geometry representing the non-profile based feature is inferred upon selection of the geometry of the feature.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing, on a CAD system comprising a database and a graphical user interface, a three-dimensional modeled object representing a physical product of the real world to be produced in a manufacturing process, the three-dimensional modeled object being stored in the database, comprising:
    displaying, on the graphical user interface (S10), the three-dimensional modeled object having a plurality of features, wherein a feature is a geometric object that forms a part of the three-dimensional modeled object;
    selecting (S20), upon user interaction with the graphical user interface, a first geometry of a first feature of the displayed three-dimensional object;
    automatically by the CAD system:
    querying and retrieving (S30) in the database at least one specification of the selected first geometry, wherein the specification of the first geometry is a written description of the first geometry and of rules that apply to said first geometry, the querying and retrieving including:
        identifying (S300) (a) the first feature to which the selected first geometry belongs, (S310) (b) a profile from which the first feature has been built, and (S320) (c) a plurality of parts forming the profile identified; and
        indexing (S330) each part of the profile;
        finding (S340) at least one part of the identified profile, from which the selected geometry results, and
        finding at least one specification associated with the at least one part found in the database according to the index associated with the part of the profile from which the selected geometry results;
    selecting (S40) at least one second feature of the displayed three-dimensional object, wherein the selecting comprises:
        determining a number of common characteristics of features of the displayed three-dimensional object with the first feature, the characteristics of a feature including a geometry of the feature and specifications associated with said geometry, and
        selecting, as the at least one second feature, at least one feature of the three-dimensional object having a number of common characteristics with the first feature, the first feature and the at least one second feature being of the same type, the at least one second feature being distinct from the first feature; and
    applying, on the selected at least one second feature, the said at least one specification retrieved from the database for propagating the design intent of the selected first feature to the at least one second feature.

2. The computer-implemented method of claim 1, wherein selecting at least one second feature comprises selecting at least one second feature that is similar to the first feature.

3. The computer-implemented method of claim 2, wherein the first and second feature are detected as being similar when both are of the same type.

4. The computer-implemented method of claim 1, further comprising:
    selecting (S60), upon user action, an additional specification to be applied on the selected at least one second feature;
    wherein applying comprises applying (S70), on the selected at least one second feature, the said at least one specification retrieved from the database and the additional specification.

5. The computer-implemented method of claim 4, wherein the additional specification is selected among a set of specifications identified (S50) in the first feature.

6. A non-transitory computer program product comprising:
    a non-transitory computer readable storage medium having recorded thereon a computer program for designing a three-dimensional modeled object representing a physical product to be produced in a manufacturing process that is stored in a database; and
    instructions included in the computer program causing one or more computers to:
        provide on a graphical user interface the three-dimensional modeled object having a plurality of features, wherein a feature is a geometric object that forms a part of the three-dimensional modeled object of a computer-aided design (CAD) system;
        select, upon user interaction with the graphical user interface, a first geometry of a first feature of the displayed three-dimensional modeled object;
    automatically by the CAD system:
    query and retrieve in the database at least one specification of the selected first geometry, wherein the specification of the first geometry is a written description of the first geometry and of rules that apply to said first geometry, the querying and retrieving including:
        identifying (S300) (a) the first feature to which the selected first geometry belongs, (S310) (b) a profile from which the first feature has been built, and (S320) (c) a plurality of parts forming the profile identified; and
        indexing (S330) each part of the profile;
        finding (S340) at least one part of the identified profile, from which the selected geometry results, and
        finding at least one specification associated with the at least one part found in the database according to the index associated with the part of the profile from which the selected geometry results;
    select at least one second feature of the three-dimensional modeled object, wherein the selecting comprises:
        determining a number of common characteristics of features of the displayed three-dimensional object with the first feature, the characteristics of a feature including a geometry of the feature and specifications associated with said geometry, and
        selecting, as the at least one second feature, at least one feature of the three-dimensional object having a number of common characteristics with the first feature, the first feature and the at least one second feature being of the same type, the at least one second feature being distinct from the first feature; and apply, on the selected at least one second feature, the said at least one specification retrieved from the database for propagating the design intent of the selected first feature to at least one second feature.

7. A computer-based system comprising:
a processor coupled to a memory; and
a graphical user interface,
the memory having recorded thereon computer code causing a computer, through the graphical user interface of a computer-aided design (CAD) system comprising a database, to design a three-dimensional modeled object representing a physical product of the real world to be produced in a manufacturing process, stored in the database, by:
displaying on the graphical user interface (S10) the three-dimensional modeled object having a plurality of features, wherein a feature is a geometric object that forms a part of the three-dimensional modeled object;
selecting (S20), upon user interaction with the graphical user interface, a first geometry of a first feature of the displayed three-dimensional modeled object;
automatically by the CAD system:
querying and retrieving (S30) in the database at least one specification of the selected first feature, wherein specification of the first geometry is a written description of the first geometry and of rules that apply to said first geometry, the querying and retrieving including:
identifying (S300) (a) the first feature to which the selected first geometry belongs, (S310) (b) a profile from which the first feature has been built, and (S320) (c) a plurality of parts forming the profile identified; and
indexing (S330) each part of the profile;
finding (S340) at least one part of the identified profile, from which the selected geometry results, and
finding at least one specification associated with the at least one part found in the database according to the index associated with the part of the profile from which the selected geometry results;
selecting (S40) at least one second feature of the three-dimensional modeled object, wherein the selecting comprises:
determining a number of common specifications of features of the displayed three-dimensional object with the first feature, the characteristics of a feature including a geometry of the feature and specifications associated with said geometry, and
selecting, as the at least one second feature, at least one feature of the three-dimensional object having a number of common characteristics with the first feature, the first feature and the at least one second feature being of the same type, the at least one second feature being distinct from the first feature; and
applying, on the selected at least one second feature, the said at least one specification retrieved from the database for propagating the design intent of the selected first feature to at least one second feature.

8. The computer-based system as claimed in claim 7 wherein the computer selecting at least one second feature comprises selecting at least one second feature that is similar to the first feature.

9. The computer-based system as claimed in claim 8 wherein the first and second feature are detected as being similar when both are of the same type.

10. The computer-based system as claimed in claim 7 wherein the computer further:
selects (S60), upon user action, an additional specification to be applied on the selected at least one second feature;
applies, on the selected at least one second feature, the said at least one specification retrieved from the database and the additional specification.

11. The computer-based system as claim in claim 10, wherein the additional specification is selected among a set of specifications identified (S50) in the first feature.

* * * * *